UNITED STATES PATENT OFFICE.

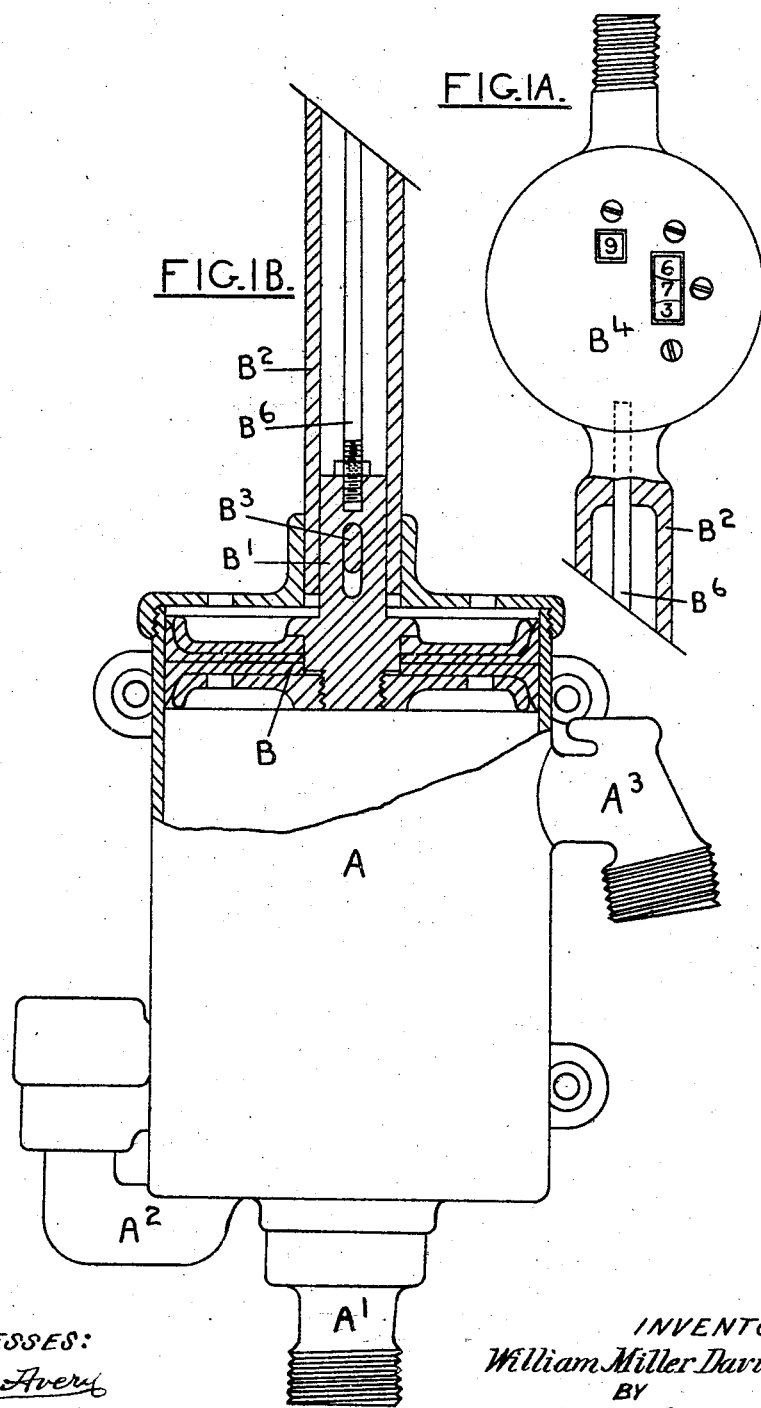

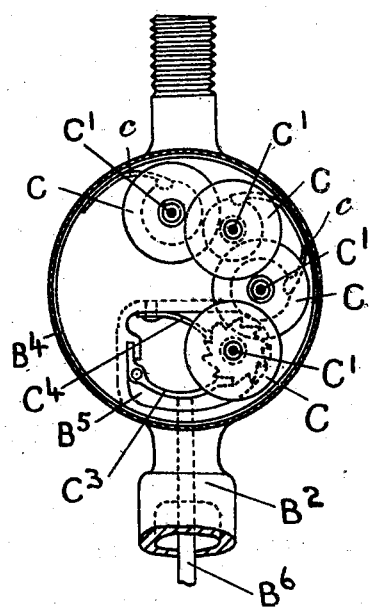
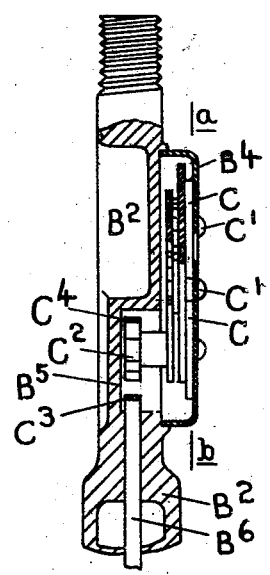
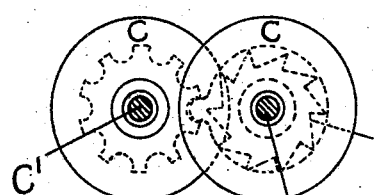
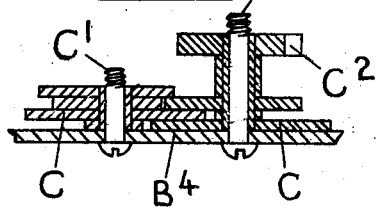
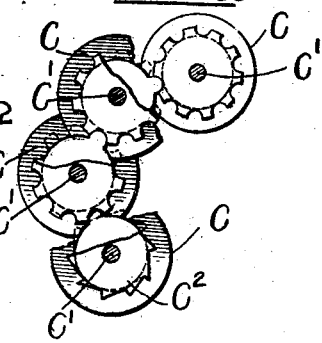

WILLIAM MILLER DAVISON, OF PORT PIRIE, SOUTH AUSTRALIA, AUSTRALIA.

MEASURING AND REGISTERING PUMP.

No. 845,532.      Specification of Letters Patent.      Patented Feb. 26, 1907.

Application filed March 22, 1906. Serial No. 307,396.

*To all whom it may concern:*

Be it known that I, WILLIAM MILLER DAVISON, engineer, a subject of the King of Great Britain and Ireland, residing at Government Road, Port Pirie West Extension, Port Pirie, State of South Australia, Commonwealth of Australia, have invented a certain new and useful Measuring and Registering Pump, of which the following is a specification.

This invention comprises a device whereby publicans and others are enabled to accurately measure out desired quantities of liquids—such, for instance, as pints, half-pints, and butchers—and at the same time a record is kept of the number of such measures sold. It is especially useful as a check upon bar attendants, the register being so constructed and operated that it cannot be tampered with by the attendant.

My invention relates to what are commonly known as "beer-pumps" or "beer-engines," and consists, essentially, of a special construction of pump and two-part piston-rod therefor, and of a registering mechanism mounted upon or contained in such rod, with means whereby the registering mechanism is operated each time the pump is operated.

My improved pump is attached beneath the counter in place of the pump now used, and the same arrangement of handles and pipes as are now used may be retained. It may be constructed of suitable size to measure and register pints, butchers, or glasses of any size that may be desired.

In order that my invention may be clearly understood, I will describe the same with reference to the accompanying drawings, in which—

Figures 1$^A$ and 1$^B$ is a front view partly in section. Figs. 2 and 3 are sectional views showing the registering mechanism, Fig. 2 being taken on a line *a b* on Fig. 3 immediately behind the cover containing same, and Fig. 3 being a central cross-section. Figs. 4 and 5 are front and sectional views, respectively, of a portion of the registering mechanism, showing in dotted lines one of the ten-toothed spur-wheels and the finger for engaging same and showing also the ratchet-wheel; and Fig. 6 is a detail view of the registering-disks and their operating means looking in the direction of the arrow, Fig. 3. These figures are drawn to a larger scale than the others.

A is the pump-barrel, which is secured beneath the counter by screws or other convenient fastening. It has inlet and outlet pipes A' and A$^2$ at the bottom, with suitable valves, and an overflow-pipe A$^3$, with valve at one side, the latter being for the purpose of insuring full measure, but not more, of liquid being supplied each time. The inlet-pipe A' is connected to the cask or other vessel, as is also the overflow-pipe A$^3$. The outlet-pipe A$^2$ is carried up to the back of the bar, as usual. The piston B has a double bucket leather or packing which causes it to be "tight" in both up and down movements. Two air-holes are provided in the cover of the pump-barrel. The piston-rod is made in two parts—a comparatively short inner portion B', secured to the piston, and a comparatively long outer tubular portion B$^2$, slidably attached to the short portion. The tubular portion carries the registering mechanism and is attached to the usual "pull" or handle. (Not shown.) The outer tubular portion is attached to the inner by means of a key or cotter B$^3$, which fits rigidly to the outer portion, but passes through a slot in the inner portion. The outer portion is of such length that when the key is at the bottom of the slot in the shorter portion then the bottom end of the outer portion bears upon the shoulder of the inner portion. The object of this is hereafter described.

The registering mechanism is contained within a cap or chamber secured upon the piston-rod. It consists of a series of numbered disks C and train of spur-wheels and operating-fingers secured upon sleeves or hollow spindles carried upon pivot-pins C'. The registering mechanism is inclosed within a cap B$^4$, the register-numbers being exposed through openings in the same. The register-numbers are not displayed except in Fig. 1$^A$. The sleeve of the units-wheel has upon its other end a ratchet-wheel C$^2$, engaged by two spring-pawls C$^3$ and C$^4$. The one pawl C$^3$ is the operative pawl, the other, C$^4$, is a check-pawl. The ratchet-wheel and pawls are contained within a small chamber B$^5$ immediately over the upper end of the tubular portion of the piston-rod. Into the top of the shorter portion B' of the piston rod is screwed (with suitable lock-nut) a light-rod B$^6$, the upper end of which passes through the top of the tubular portion into the chamber B$^5$ and impinges against the spring-pawl $C^3$. The sleeve of the units-disk carries a finger which as it rotates engages a ten-toothed spur-wheel upon the sleeve of the tens-disk. The sleeve of the tens-disk carries a finger which as it rotates engages a ten-toothed spur-wheel upon the sleeve of the hundreds-disk, and the sleeve of the hundreds-disk carries a finger which as it rotates engages a ten-toothed spur-wheel upon the sleeve of the thousands-disk. Each of the spur-wheels is engaged and held by a check-spring $c$, except when being operated by its respective finger.

The operation of my invention is as follows: The pump is fixed and connected in the usual way. Upon the movement of the pull or handle the piston is raised within the barrel, drawing in a supply of liquid through the inlet-pipe. Upon the pull or handle being moved in the opposite direction the piston B is not operated until the tubular portion $B^2$ of the piston-rod has traveled downward onto the shoulder of the inner portion $B'$ and the cotter $B^3$ down to the bottom of the slot. This movement of the tubular outer portion relatively to the inner portion of the rod causes the light rod $B^6$ to pass up into the chamber $B^5$ and flatten the spring-pawl $C^3$ and so operate the ratchet-wheel $C^2$, and with it the units-wheel C of the register. As the movement of the pull or handle is continued the piston is pushed down in the barrel, the surplus liquor being first discharged through the overflow-pipe into the cask, and the required quantity of liquid is then forced up through the outlet-pipe into the glass or other receptacle. Upon the movement of the pull or handle being reversed to draw the piston up again the tubular portion $B^2$ of the piston-rod is first drawn up relatively to the inner portion $B'$ and over the light rod $B^6$ until the cotter $B^3$ meets the top of the slot, and this allows the spring-pawl $C^3$ to return to its curved position, passing over the top of the adjacent tooth of the ratchet-wheel $C^2$ and falling into engagement with the next. As the pump is again depressed the straightening of the spring-pawl $C^3$ operates the ratchet-wheel $C^2$ and with it the disk C, altering the register-number again. Upon the tenth movement of the units-wheel its attached finger engages the adjacent tooth on the spur-wheel of the tens-disk and this is moved on. Similarly, the hundreds-disk and the thousands-disk are operated by the tenth movement of the fingers of the tens-disk and the hundreds-disk, respectively. There is no need to reset the register, since after registering "9999" it begins again at "0," and so on indefinitely.

Having now fully described and ascertained my said invention and the manner in which it is to be performed, I declare that what I claim is—

1. In a pump for vending measured quantities of liquid a piston-rod in two parts capable of movement one against the other, such movement operating a registering mechanism mounted upon the piston-rod substantially as described.

2. In a pump for vending measured quantities of liquid a piston-rod in two parts capable of movement one against the other such parts comprising a short inner portion and an outer tubular portion, the short inner portion being secured to the piston and the longer tubular portion being slidably attached to the short portion by a key or cotter fitting rigidly to the one part but passing through a slot in the other and the said inner portion carrying a rod passing up through the top of the tubular portion and operating the registering mechanism substantially as described.

3. In a pump comprising means for both measuring and registering, a piston-rod in two parts a registering mechanism mounted upon a suitable portion of the piston-rod and comprising a series of numbered disks with a train of spur-wheels and operating-fingers, the units-wheel of the series being moved by a pawl which on each downward movement of the pump is operated by means of a rod carried by the other part of the piston-rod substantially as described.

4. An improved pump for vending measured quantities of liquid and for registering the number of such measures sold comprising a pump-barrel with inlet and outlet pipes at the bottom and overflow-pipe at one side and containing a piston with a bucket "tight" in both up and down movements, the piston-rod being made in two parts, a comparatively short inside portion secured to the piston and a comparatively long outside tubular portion slidably attached to the short portion, the tubular portion carrying a registering mechanism which is operated by a rod projecting from the top of the short portion and through the top of the tubular portion substantially as described.

In testimony that I claim the foregoing as my invention I have signed my name, in the presence of two subscribing witnesses, this 6th day of February, 1906.

WILLIAM MILLER DAVISON.

Witnesses:
 ARTHUR GORE COLLISON,
 GLADYS CLARE WILLIAMS.